(12) United States Patent
Inose

(10) Patent No.: US 8,495,052 B2
(45) Date of Patent: Jul. 23, 2013

(54) DATA PROCESSING APPARATUS, DATA PROCESSING METHOD, AND COMPUTER-READABLE STORAGE MEDIUM STORING A PROGRAM

(75) Inventor: Koji Inose, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 129 days.

(21) Appl. No.: 12/922,907

(22) PCT Filed: Jul. 14, 2010

(86) PCT No.: PCT/JP2010/062281
§ 371 (c)(1),
(2), (4) Date: Sep. 16, 2010

(87) PCT Pub. No.: WO2011/021467
PCT Pub. Date: Feb. 24, 2011

(65) Prior Publication Data
US 2012/0016844 A1 Jan. 19, 2012

(30) Foreign Application Priority Data
Aug. 21, 2009 (JP) ................................. 2009-192489

(51) Int. Cl.
*G06F 17/30* (2006.01)
(52) U.S. Cl.
USPC ........................................................ 707/707
(58) Field of Classification Search
USPC .................................................. 707/640, 661
See application file for complete search history.

(56) References Cited

U.S. PATENT DOCUMENTS

| 5,751,854 | A  | * | 5/1998 | Saitoh et al. | ................... | 382/218 |
| 6,272,248 | B1 | * | 8/2001 | Saitoh et al. | ................... | 382/218 |
| 7,738,143 | B2 | * | 6/2010 | Ishimoto et al. | ............. | 358/3.28 |
| 7,755,783 | B2 |   | 7/2010 | Aritomi et al. | | |
| 2004/0162842 | A1 | * | 8/2004 | Ono et al. | ...................... | 707/100 |
| 2007/0147929 | A1 | * | 6/2007 | Ishimoto et al. | ................ | 400/62 |
| 2009/0055903 | A1 |   | 2/2009 | Inose | | |

FOREIGN PATENT DOCUMENTS

| JP | 11-296336    | 10/1999 |
| JP | 2003-016057  | 1/2003  |
| JP | 2003-256281  | 9/2003  |
| JP | 2004-302654  | 10/2004 |
| JP | 2005-205722  | 8/2005  |
| JP | 2006-178939  | 7/2006  |
| JP | 2007-087305  | 4/2007  |

OTHER PUBLICATIONS

International Search Report dated Sep. 15, 2010.
Written Opinion of the International Searching Authority.
Notification of Transmittal of the International Search Report and the Written Opinion of the International Searching Authority.

* cited by examiner

*Primary Examiner* — Baoquoc N To
(74) *Attorney, Agent, or Firm* — Fitzpatrick, Cella, Harper & Scinto

(57) ABSTRACT

A table is provided including a document name and content that is included the document data thereof and for which the number of times that duplication is permitted is restricted, in association with each other. The table is referenced, and a determination is made as to whether document data targeted for duplication processing includes content for which duplication processing is restricted. If a determination is made that such content is included, deletion-completed document data in which the content has been deleted from the document data is generated (S309), and the document name, the deletion-completed document data, and information regarding the content are stored in association with each other (S313).

10 Claims, 10 Drawing Sheets

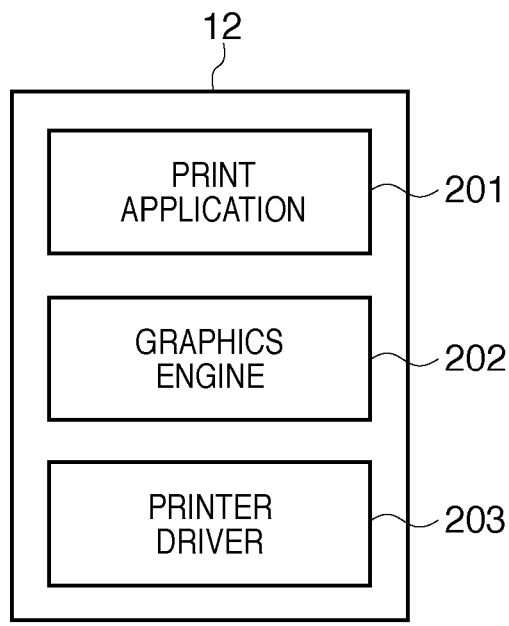
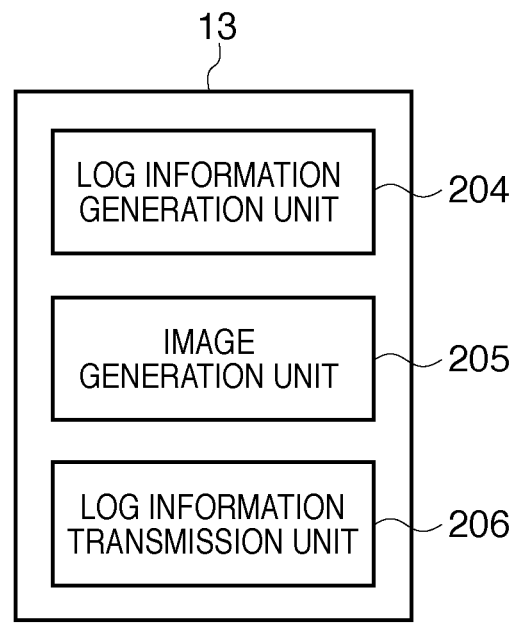

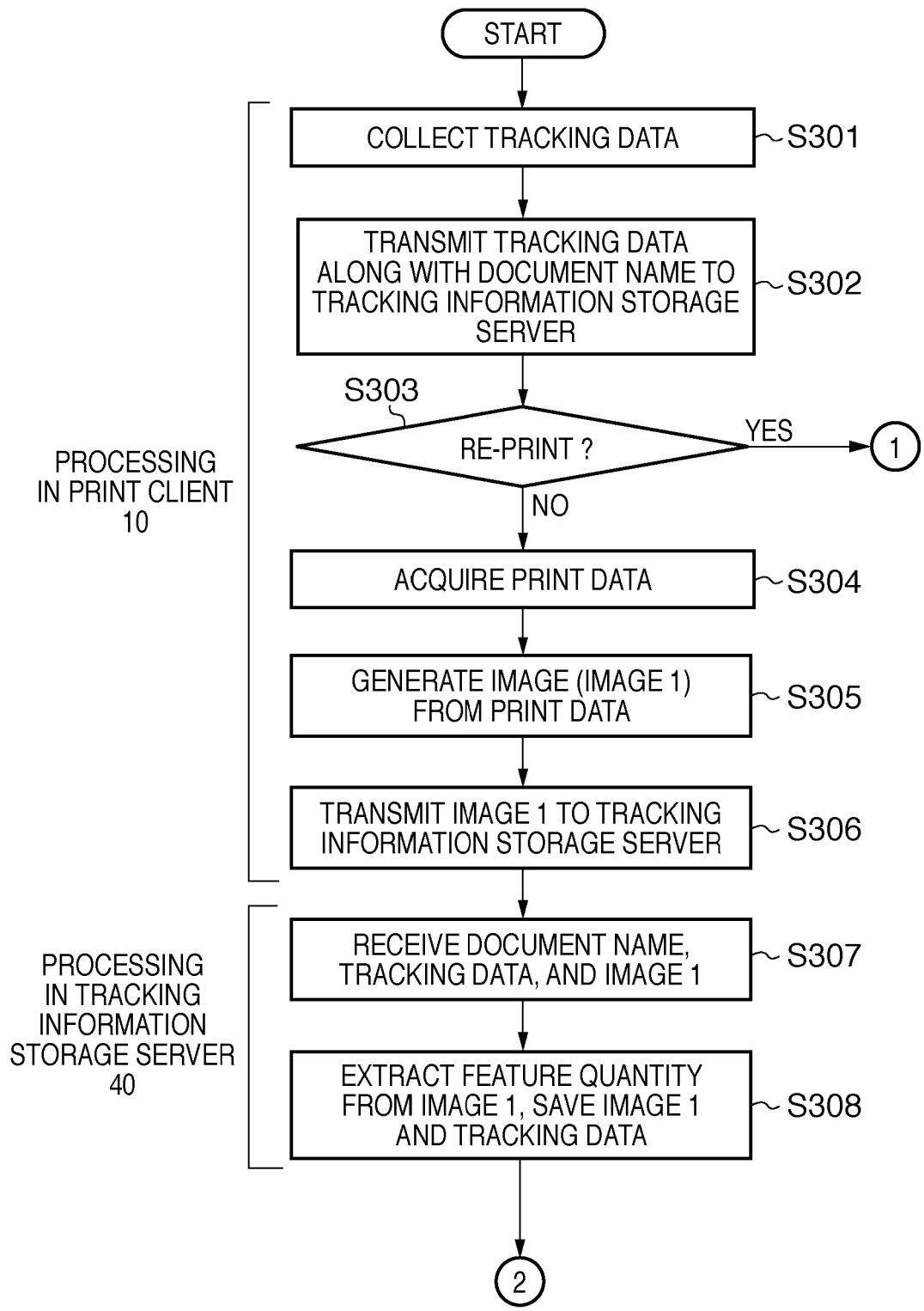

FIG. 4A

| DOCUMENT NAME | CopyRight Contents No. |
|---|---|
| Book_A | CC0001 |
| Book_B | CC0002 |

| DOCUMENT NAME | Name | FEATURE QUANTITY | Path |
|---|---|---|---|
| Book_A | John | INCLUDES ABC INCLUDES XYZ | C:¥trace¥trace0001.jpg |
| Book_B | Mike | INCLUDES ** | C:¥trace¥trace0002.jpg |

| DOCUMENT NAME | Name | IMAGE MANAGEMENT METHOD | Link INFORMATION |
|---|---|---|---|
| Book_A | John | Link | Page=3, x=100, y=100, URL=172.24.1.1/CC/CC01.jpg |
| Book_B | Mike | Link | Page=2, x=100, y=100, URL=172.24.1.1/CC/CC02.jpg |

| DOCUMENT NAME | CopyRight Contents No. | Copy Limitation | Current |
|---|---|---|---|
| Book_A | CC0001 | 5 | 2 |
| Book_B | CC0002 | 10 | 10 |

| DOCUMENT NAME | Name | IMAGE MANAGEMENT METHOD | Link INFORMATION |
|---|---|---|---|
| Book_A | John | Full | null |
| Book_B | Mike | Link | Page=2, x=100, y=100, URL=172.24.1.1/CC/CC02.jpg |

705　706　707　708

DATA PROCESSING APPARATUS, DATA PROCESSING METHOD, AND COMPUTER-READABLE STORAGE MEDIUM STORING A PROGRAM

This is a U.S. National Phase of PCT/JP2010/062281, internationally filed on Jul. 14, 2010.

TECHNICAL FIELD

The present invention relates to a data processing apparatus for performing duplication processing on document data, a data processing method, and a computer-readable storage medium storing a program.

BACKGROUND ART

One cause of information leaks is a situation where printed matter that has been printed inside a company is taken outside the company. As a countermeasure for such information leaks, methods and systems have been proposed in which printed content is accumulated, and information tracking (knowing who printed what) can be performed. Japanese Patent Laid-Open No. 2006-178939 discloses a method in which a printer driver side is provided with a configuration for generating a print log and transmitting the print log to a print log storage server and a configuration for performing setting regarding the generation of print logs, and in which it is possible to perform management and detailed setting regarding print logs on the client side.

When print content is accumulated (that is, saved as electronic data), consideration needs to be given to whether there are constraints on the save processing itself. In general, processing for outputting certain content as printed matter and processing for saving electronic data in an easily reusable form in a storage apparatus such as a hard disk are often considered to be duplication processing, regardless of the type of processing.

Also, Japanese Patent Laid-Open No. 2004-302654 proposes a method to restrict the number of times printing can be performed according to a preset value. In the case where printed content is saved as image data, and then the same content is to be printed, if the previously saved image is searched for through an image search and found as a result, such processing is considered to be duplication. Copying is controlled according to the number of times that such duplication is permitted.

Consider the case where in a system in which printed documents are saved and accumulated, a document contains content for which the number of times that duplication can be performed or the like is restricted. In this case, it is possible for the number of times that duplication is performed to unintendedly exceed the restriction due to the sum of the number of times that printing was performed and the number of times that document data for printing was saved. In order to prevent this, a method is conceivable in which when document data targeted for duplication processing is to be saved, content for which duplication processing is restricted is removed when saving the document data.

However, in such a case, the restricted content is not included in the saved document data, and therefore the efficiency in searching decreases when performing an image search on accumulated document data in order to make a determination regarding duplication such as in Japanese Patent Laid-Open No. 2004-302654.

SUMMARY OF INVENTION

An aspect of the present invention is to eliminate the above-mentioned problems with the conventional technology.

The present invention provides a data processing apparatus that saves document data from which content for which duplication processing is restricted has been deleted, as well as saves information regarding the restricted content, a data processing method, and a computer-readable storage medium storing a program.

The present invention in its first aspect provides a data processing apparatus that performs duplication processing on document data, including: a first determining unit configured to determine whether the document data targeted for duplication processing includes content for which duplication is restricted; a generating unit configured to, in a case where a determination has been made that the document data includes content for which duplication is restricted, generate deletion-completed document data in which the content for which duplication is restricted has been deleted from the document data; and a saving unit configured to save a document name, the deletion-completed document data, and link information regarding the content for which duplication is restricted in association with each other.

The present invention in its second aspect provides a data processing method executed in a data processing apparatus that performs duplication processing on document data, including the steps of: determining whether the document data targeted for duplication processing includes content for which duplication is restricted; generating, in a case where a determination has been made that the document data includes content for which duplication is restricted, deletion-completed document data in which the content for which duplication is restricted has been deleted from the document data; and saving a document name, the deletion-completed document data, and link information regarding the content for which duplication is restricted in association with each other.

The present invention in its third aspect provides a computer-readable storage medium storing a program executed in a data processing apparatus that performs duplication processing on document data, the program causing a computer serving as the data processing apparatus to: determine whether the document data targeted for duplication processing includes content for which duplication is restricted; generate, in a case where a determination has been made that the document data includes content for which duplication is restricted, deletion-completed document data in which the content for which duplication is restricted has been deleted from the document data; and save a document name, the deletion-completed document data, and link information regarding the content for which duplication is restricted in association with each other.

According to the present invention, document data from which content for which duplication processing is restricted has been deleted is saved, and information regarding the restricted content is also saved, thereby enabling preventing a decrease in search efficiency.

Further features of the present invention will become apparent from the following description of exemplary embodiments with reference to the attached drawings.

BRIEF DESCRIPTION OF DRAWINGS

FIGS. 2A and 2B are diagrams respectively showing a print control unit and a log control unit shown in FIG. 1.

FIGS. 3A and 3B are diagrams showing a data processing procedure in document duplication processing according to Embodiment 1.

FIGS. 4A to 4C are diagrams showing tables used in the processing shown in FIGS. 3A and 3B.

FIGS. 7A and 7B are diagrams showing tables used in the processing shown in FIGS. 6A and 6B.

DESCRIPTION OF EMBODIMENTS

Figure 1:
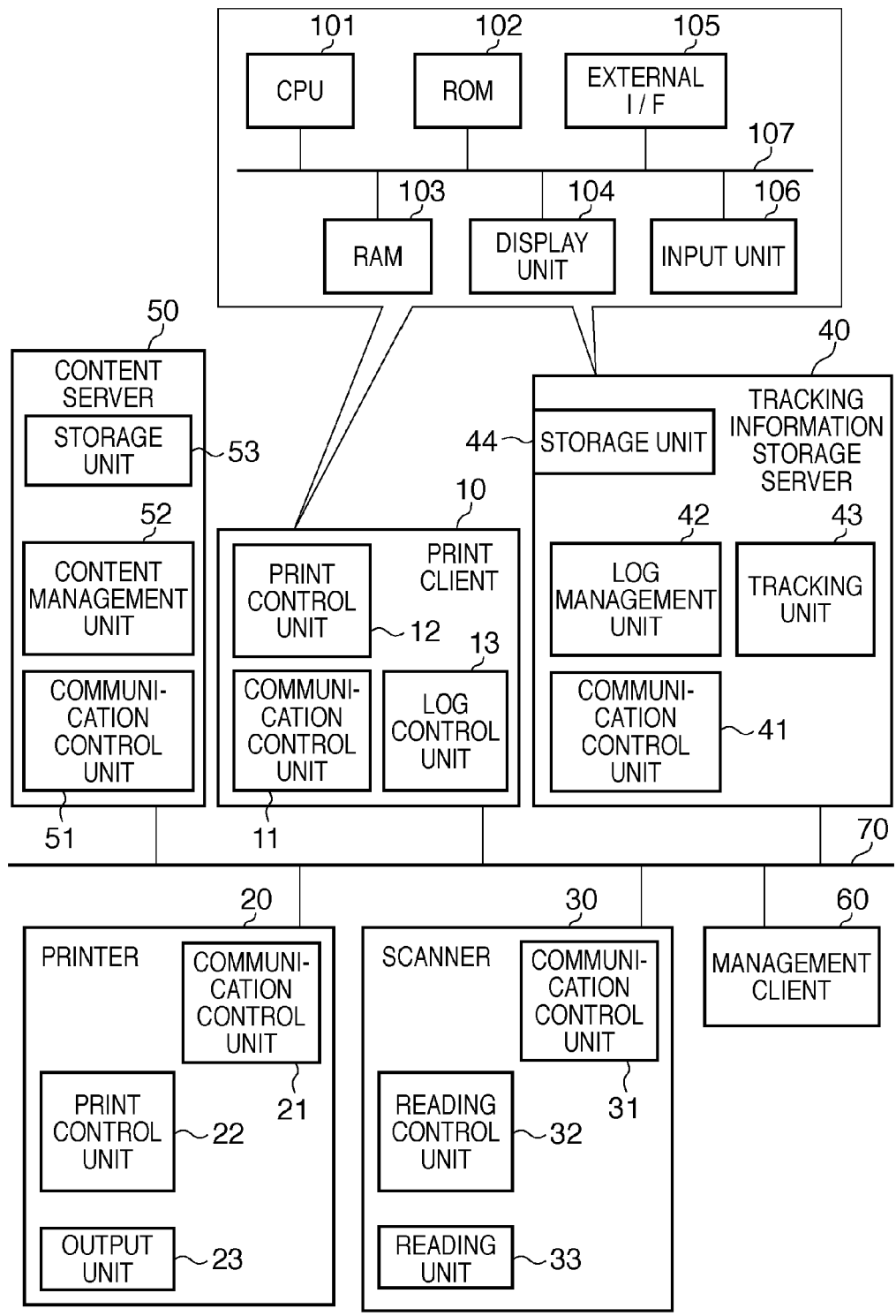
FIG. 1 is a diagram showing a configuration of an information tracking system.

Preferred embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. Note that the same reference numerals have been given to constituent elements that are the same, and redundant descriptions thereof will not be given.

Embodiment 1

FIG. 1 is a diagram showing a configuration of an information tracking system according to the present embodiment. This system includes a print client 10, a printer 20, a scanner 30, a tracking information storage server 40, a content server 50, and a management client 60. These apparatus are communicatively connected to each other via a network 70. In this system, when a document or the like has been printed by the print client 10, that document data is stored and accumulated in the tracking information storage server 40, and the management client 60 can track information regarding the print processing. Also, in this system, print processing, data save processing, copy processing, and the like that are performed with respect to a document is collectively referred to as "duplication processing".

In the present embodiment, a general-purpose PC or the like is used as the print client 10 and the tracking information storage server 40 that are treated as a data processing apparatus. Accordingly, the print client 10 has a hardware configuration including a ROM 102 and a RAM 103 that are storage areas, a display unit 104 for displaying user interface screens, an external I/F 105 that is a communication interface with external devices, an input unit 106 such as a keyboard, and a CPU 101 that controls these elements. The above CPU 101 to input unit 106 are communicatively connected to each other via a bus 107. The content server 50 and the management client 60 may also have hardware configurations such as that described above.

For each of the apparatus shown in FIG. 1, only the main function blocks for realizing the functionality according to the present embodiment through the above-described hardware configurations are shown. The print client 10 includes a communication control unit 11, a print control unit 12, and a log control unit 13. The communication control unit 11 controls data communication with external apparatus. The print control unit 12 causes the printer 20 to execute printing in accordance with a user instruction. The log control unit 13 generates log information such as a login username and print execution date information, and generates document data for printing and the like. Also, both print processing and electronic data save processing performed in accordance with an instruction from the print control unit 12 are treated as duplication processing without distinguishing therebetween, and the log control unit 13 generates and deletes document data according to a restriction on the number of times that such duplication can be performed.

The printer 20 includes a communication control unit 21, a print control unit 22, and an output unit 23. The communication control unit 21 has the same functionality as the communication control unit 11. The print control unit 22 receives PDL data from the print client 10 via the communication control unit 21, and converts the PDL data into print data (RIP). The output unit 23 outputs print data to a printing medium in accordance with an instruction from the print control unit 22. The scanner 30 includes a communication control unit 31, a reading control unit 32, and a reading unit 33. The communication control unit 31 has the same functionality as the communication control unit 11. The reading unit 33 optically reads characters and the like that are printed on a printing medium such as paper. The reading control unit 32 transfers document data read by the reading unit 33 to an external apparatus via the communication control unit 31.

The tracking information storage server 40 includes a communication control unit 41, a log management unit 42, a tracking unit 43, and a storage unit 44. The communication control unit 41 has the same functionality as the communication control unit 11. The log management unit 42 manages log information and document data that have been received from the print client 10, in association with each other. The tracking unit 43 searches the storage unit 44 for document data that matches document data that has been read by the scanner 30 and transmitted via the communication control unit 31, in accordance with an instruction received from the management client 60 via the communication control unit 41. The tracking unit 43 also converts document data targeted for searching into data that can be displayed by the management client 60. The storage unit 44 stores log information and document data that have been received from the print client 10.

The content server 50 includes a communication control unit 51, a content management unit 52, and a storage unit 53. The communication control unit 51 has the same functionality as the communication control unit 11. The content management unit 52 provides image content necessary for printing via the communication control unit 51 based on a request from the print client 10 or the tracking information storage server 40. The storage unit 53 stores document data managed by the content management unit 52.

FIG. 2A is a diagram showing a functional configuration of the print control unit 12 of the print client 10. The print control unit 12 includes a print application 201, a graphics engine 202 typified by GDI, which is rendering processing, and a printer driver 203 that generates printer-specific print data. First, a user instructs the printer 20 to perform printing from the print application 201. Then, the graphics engine 202 calls the printer driver 203 that has been provided, and sets the output of the print application 201 in the printer driver 203. In this way, the print application 201 can pass setting data set by the user to the printer driver 203 through a rendering instruction. The printer driver 203 converts the received rendering instruction into page description language (PDL) data specific to the printer 20, and transmits the PDL data to the printer 20.

FIG. 2B is a diagram showing a configuration of the log control unit 13 of the print client 10. The log control unit 13 includes a log information generation unit 204, an image generation unit 205, and a log information transmission unit 206. The log information generation unit 204 acquires log information such as a login username and print execution date information from the PDL data received from the printer driver 203. The image generation unit 205 generates document data from the PDL data received from the printer driver 203. The log information transmission unit 206 transmits the acquired log information and generated document data to the tracking information storage server 40. Note that the log control unit 13 may be configured as an add-on module added to the printer driver 203, or may be configured as an independent library module.

Below is a description of a processing procedure executed when printing is performed in the information tracking system of the present embodiment with reference to FIGS. 3A and 3B. When a document name is specified through a user instruction and print processing, which is included in duplication processing, is started, first a determination is made as to whether the document targeted for processing includes content for which duplication processing is restricted. This determination is described below with reference to FIGS. 4A to 4C.

FIG. 4A is a diagram showing an example of a table used when determining whether a document includes content for which duplication processing is restricted, in the case where printing is executed by the print client. This determination is an example of first determination processing of the present invention. The table shown in FIG. 4A is stored in the print client 10 and includes document names by which printing targets are identified and attributes of content managed by the content server 50, in association with each other. Each item 401 indicates a document name representing a printing target, and each item 402 indicates a number for identifying content that is included in the corresponding printing target document and for which duplication processing is restricted. When the execution of printing of a printing target document is started in accordance with a user instruction, the item 402 corresponding to the printing target document name among the document names indicated by the items 401 is referenced, and a determination is made as to whether the content of the item 402 is null. If the content is null, a determination is made that the document does not include content for which duplication processing is restricted, and if the content is not null, a determination is made that the document includes content for which duplication processing is restricted.

Below is a description of processing performed in the case of performing printing after a determination has been made that the printing target document includes content for which duplication processing is restricted, with reference to FIGS. 3A and 3B. FIGS. 3A and 3B are flowcharts showing an overall processing procedure performed in this system. Among the processing shown in FIGS. 3A and 3B, the processing performed in the print client 10 is executed by, for example, the CPU 101 of the print client 10, and the processing performed in the tracking information storage server 40 is executed by, for example, the CPU 101 of the tracking information storage server 40.

When the printing of a printing target document has started in accordance with a user instruction, the log information generation unit 204 of the log control unit 13 in the print client 10 collects tracking data such as the username of the user who instructed the printing to be executed (S301). Next, the log information transmission unit 206 acquires the tracking data from the log information generation unit 204, and transmits the tracking data along with the document name to the tracking information storage server 40 (S302). The print control unit 12 determines whether the document specified by the user is to be printed for the first time or is to be re-printed (S303). If a determination is made that the document is to be printed for the first time, the procedure advances to S304, and if a determination is made that the document is to be re-printed, the procedure advances to S313. The print control unit 12 acquires, from the printer driver 203, print data such as POI, data corresponding to the document specified by the user (S304). The image generation unit 205 of the log control unit 13 generates document data from the print data acquired in S304, as image data in a JPEG or TIFF format or the like (S305). The document data generated in S305 is shown as image 1 in FIGS. 3A and 3B. The log information transmission unit 206 transmits the generated document data to the tracking information storage server 40 (S306).

Next, the log management unit 42 of the tracking information storage server 40 receives the tracking data, the document name, and the document data from the print client 10 (S307). The log management unit 42 extracts an image feature quantity from the received document data, and temporarily saves the document data and feature quantity (S308). A feature quantity as used herein refers to data that quantitatively expresses, for example, a frequency characteristic of an image or a color feature for each predetermined unit of blocks.

FIG. 4B is a diagram showing an example of a table saved in the tracking information storage server 40 in S308. Each item 403 indicates a document name. Each item 404 indicates a piece of tracking data, which in the present embodiment is the username of the user who instructed printing to be executed. Each item 405 indicates an image feature quantity, which in the present embodiment is a character string included in the printed content. Each item 406 indicates the storage location of corresponding document data in the tracking information storage server 40.

Figure 5A:
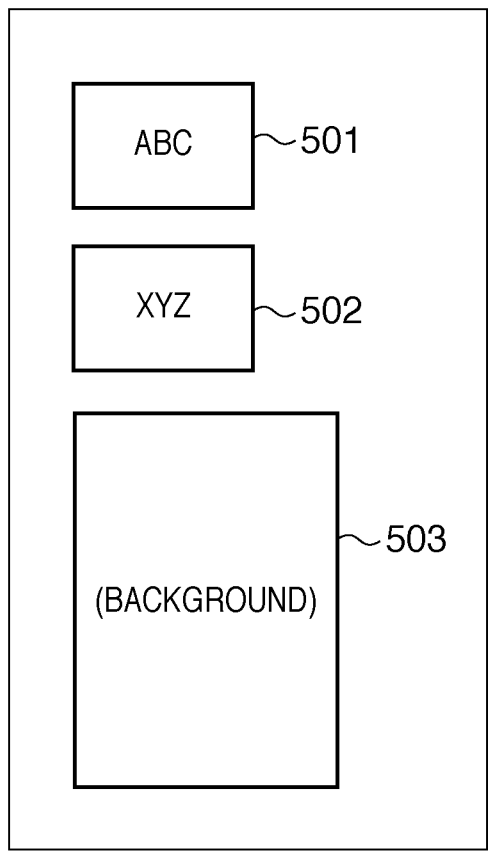
FIGS. 5A to 5C are diagrams showing content and print content that has been printed.
Figure 5B:
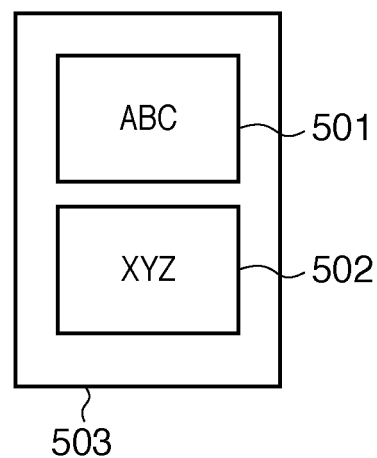
Figure 5C:
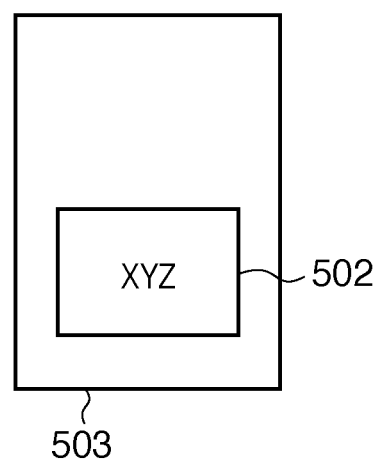

Next, the image generation unit 205 of the log control unit 13 in the print client 10 generates, from the document data, deletion-completed document data from which content for which duplication is restricted has been deleted (S309). The deletion-completed document data generated in S309 is shown as image 2 in FIGS. 3A and 3B. Below is a description of document data with reference to FIGS. 5A to 5C. FIGS. 5A to 5C are diagrams showing examples of content saved in the content server 50 and examples of print content that has been printed including combinations of the content. FIG. 5A shows a content group (content 501 to 503) used by the print application 201. FIG. 5B shows an image of a document that the user has instructed to be printed, in which the content 501 and 502 are superimposed on the content 503 that is a background. FIG. 5C conceptually shows an image of document data generated by the image generation unit 205 in S309. Among the content 501, 502, and 503 shown in FIG. 5A, the content 501 is assumed to be content for which duplication processing is restricted. As shown in FIG. 5C, the content 501 for which duplication processing is restricted has been deleted in S309 from the image in which the content 501 and 502 are superimposed on the content 503 that is the background.

The log information transmission unit 206 transmits the deletion-completed document data generated in S309, the document name, and information regarding the content 501 to the tracking information storage server 40 (S310). Here, the information regarding the content 501 is, for example, the coordinates of the content 501 on the content 503, and the storage location of the content 501 in the content server 50. The log information transmission unit 206 instructs the tracking information storage server 40 to delete the document data that was temporarily saved in S308 (S311).

The tracking information storage server 40 deletes the document data corresponding to FIG. 5B based on the instruction transmitted in S311 (S312). The log management unit 42 of the tracking information storage server 40 receives the deletion-completed document data, the document name, and the information regarding the content 501 that was transmitted from the print client 10 in S310. Furthermore, the log management unit 42 saves the document name and tracking data received in S307 in association with the document name (S313). Specifically, the document name, the deletion-completed document data from which the content 501 has been deleted, the information regarding the content 501, and the tracking data are saved in association with each other. It should be noted that if a determination is made that the document is to be re-printed in S303, in S313 the document name and the tracking data are saved in association with each other.

FIG. 4C is a diagram showing an example of a table saved in the tracking information storage server 40 in S313. Each item 407 indicates a document name. Each item 408 indicates a piece of tracking data, which in the present embodiment is the username of the user who instructed printing to be executed. The first item 409 indicates that it is necessary to composite document data (Book_A) from which content (CC0001) has been deleted and the content (CC0001) again when display or printing is performed by the management client 60 for the purpose of tracking. In the present embodiment, "Link" is displayed to mean that the document data and the content (CC0001) are to be composited. Also, the content (CC0001) is specifically an example of content for which duplication processing is restricted. The first item 410 indicates the coordinates of the content (CC0001) and the storage location of the content (CC0001) in the content server 50, which are necessary when performing compositing. Specifically, this item is an example of the above-described information regarding content.

When the document "Book_A" that a user (for example, John) has printed is to be displayed or printed by the management client 60 for the purpose of tracking, an instruction to perform display or print processing is transmitted to the tracking information storage server 40 using the document name. The tracking information storage server 40 references the table in FIG. 4C, and performs a search using the document name (Book_A), the username (John), and the feature quantity. Then, the tracking information storage server 40 determines, based on the corresponding item 409 in FIG. 4C, that it is necessary to perform compositing since the document includes content for which duplication processing is restricted. The tracking information storage server 40 references the corresponding item 410, acquires the content for which duplication processing is restricted from the content server 50, and composites the content with the document data from which the content for which duplication processing is restricted has been deleted. The tracking information storage server 40 prepares the composited document data for display or printing by the management client 60 as document data for tracking.

As described above, in a system in which a target document that has been duplicated (for example, printed or saved) by a user is saved for the purpose of tracking, if the target document includes content for which duplication processing is restricted, the target document is saved in a state in which the content has been deleted. As a result, in processing in which a document is printed and saved in this system, it is possible to prevent content that has a restriction in place from being unintendedly duplicated more times than the number of times indicated by the restriction.

Also, when the document from which the content has been deleted is saved, a table associating the name of the target document and information indicating where the deleted content is managed in the system is saved in addition to the document. In the case where the document corresponding to the target document is searched for among a plurality of saved document in order for the target document to be printed by the management client for the purpose of tracking, the search is performed using the document name, a username, and a feature quantity. Accordingly, it is possible to prevent a decrease in search efficiency even if the search target document is a document from which content has been deleted.

Embodiment 2

Below is a description of Embodiment 2 with reference to FIGS. 6A and 6B. In the present embodiment, it is assumed that the restriction regarding duplication processing is a number of times that duplication is permitted.

When a document name is specified through a user instruction and print processing, which is included in duplication processing, is started, first a determination is made as to whether the document targeted for processing includes content for which duplication processing is restricted. In the present embodiment, the print client 10 makes this determination using a table such as is shown in FIG. 7A. Items 701 shown in FIG. 7A are the same as the items 401 shown in FIG. 4A. Also, items 702 are the same as the items 402. Unlike Embodiment 1, the table in the present embodiment includes items 703 that indicate a number of times that duplication processing is permitted, and items 704 that indicate the current number of times that duplication has been performed. In other words, the items 703 and the items 704 indicate content regarding a restriction on duplication processing with respect to content included in the corresponding target document.

Figure 6A:
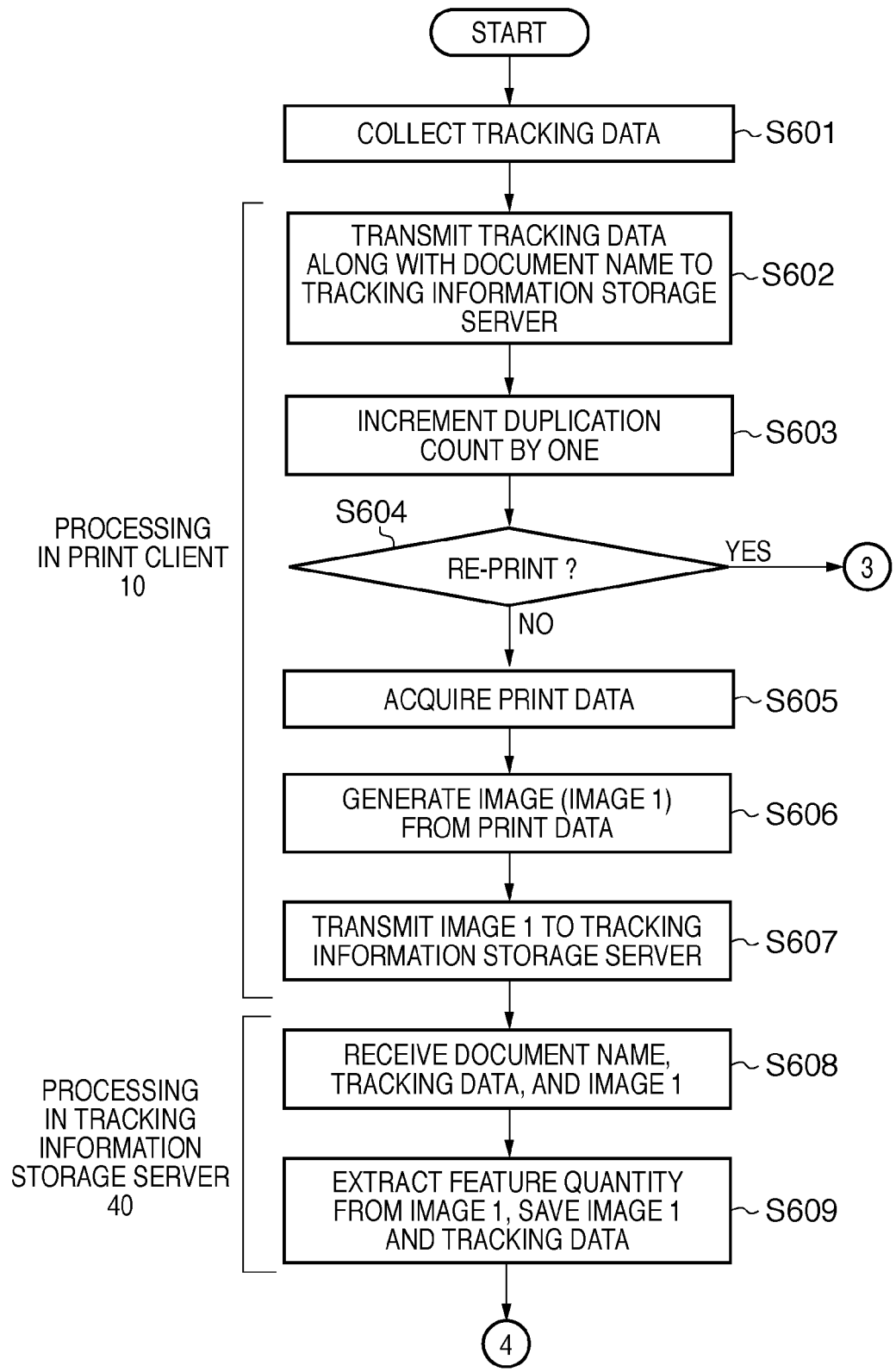
FIGS. 6A and 6B are diagrams showing a data processing procedure in document duplication processing according to Embodiment 2.
Figure 6B:
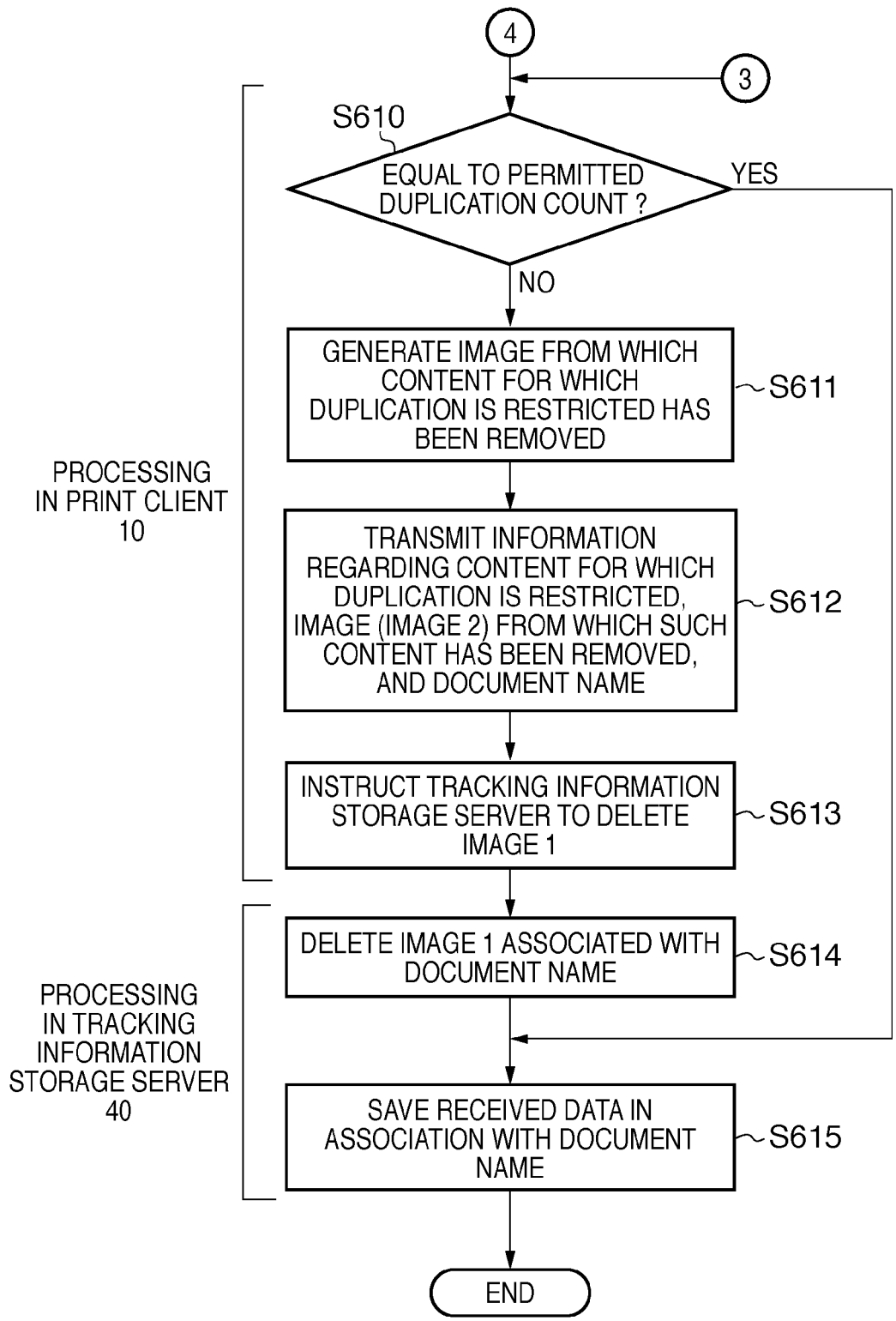

If a determination is made that the target document includes content for which duplication processing is restricted, the processing shown in FIGS. 6A and 6B is performed. In FIGS. 6A and 6B, S601 and S602 are the same as S301 and S302 respectively. Also, S604 to S609 are the same as S303 to S308 respectively. Also, S611 to S615 are the same as S309 to S313 respectively.

In the present embodiment, the print client 10 counts the number of times that duplication processing (printing or saving) has been performed, and in S603 after S602, the print client 10 increments the count value by one. The count value updated in S603 is reflected in the corresponding item 704 in FIG. 7A.

In the present embodiment, in S610 after S609, the print client 10 references the table shown in FIG. 7A, and determines whether the value indicated by the item 704 is equal to the value indicated by the corresponding item 703. This determination is an example of second determination of the present invention. If a determination is made that the value indicated by the item 704 is equal to the value indicated by the item 703, the procedure advances to S615. On the other hand, if a determination is made that the value indicated by the item 704 is not equal to the value indicated by the item 703 (that is, is less than the duplication count indicated by the item 703), the processing of S611 and onward is performed.

FIG. 7B is a diagram showing an example of a table stored in the tracking information storage server 40 as a result of the processing in S615. The items 705 to 708 shown in FIG. 7B are the same as the items 407 to 410 shown in FIG. 4C. In the present embodiment, data ("Full" and "null") indicating that a determination has been made that the value indicated by the item 704 is equal to the value indicated by the item 703 in S610 is stored in association with the document name "Book_A". In other words, the restriction on the number of times that duplication is permitted has been reached due to the Book_A being printed, and therefore further duplication (printing or saving) of the Book_A is prohibited. Accordingly, even if processing for printing the Book_A is performed by the management client 60 after the processing shown in FIGS. 6A and 6B has been performed, it is possible to reference FIG. 7B and determine, based on "Full" being indicated as the image management method, that the restriction on the number of times that duplication is permitted has been reached, and that duplication processing is prohibited. It also goes without saying that the storage location (link information) of the content for which duplication processing is restricted is not stored, and instead indicated as "null".

As described above, the present embodiment has a configuration in which, in addition to the configuration in Embodiment 1, the number of times that duplication processing such as printing or saving has been performed is counted for each document, and document data (the images 1 and 2 shown in FIGS. 3A and 3B) is stored in the tracking information storage server until the number of times that duplication is permitted has been reached. Also, when the number of times that duplication is permitted has been reached, only the image 1 is stored, and information indicating the content for which duplication processing is restricted is not stored. As a result, it is possible to prevent duplication processing for the purpose of tracking from being performed by the management client 60 if performing such duplication processing would exceed the number of times that duplication is permitted.

Embodiment 3

Figure 3B:
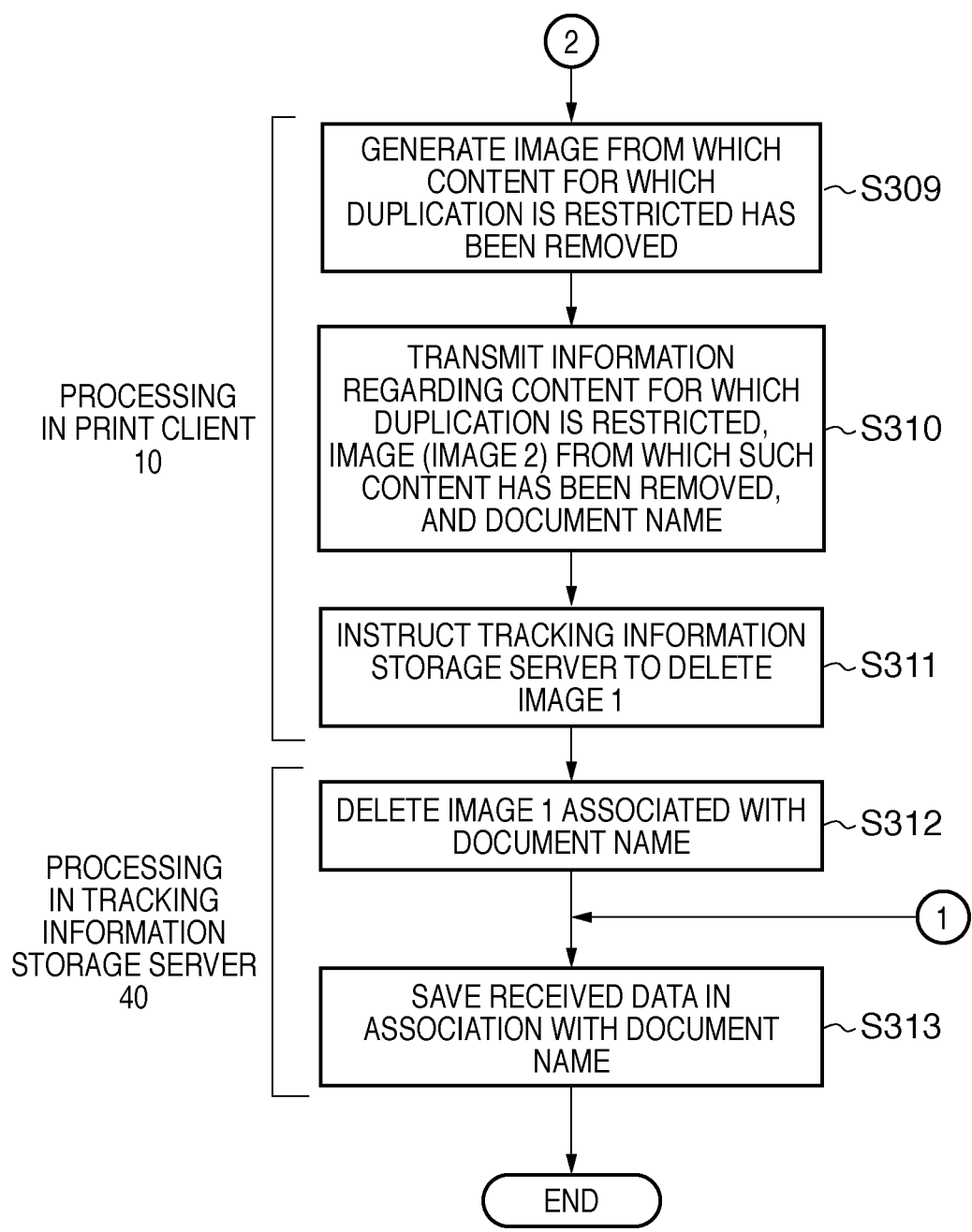
Figure 8:
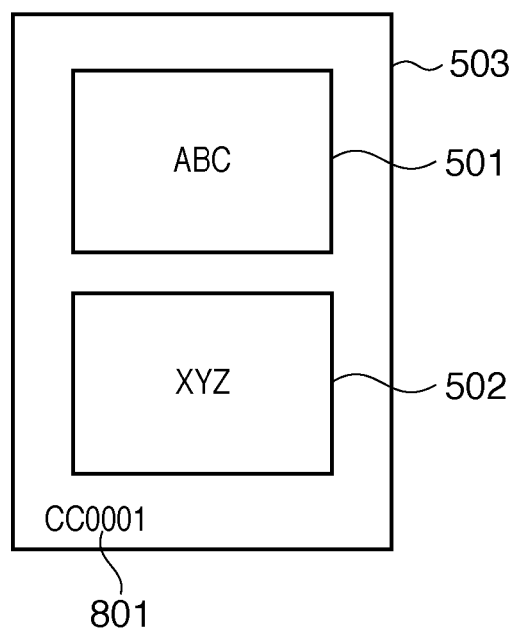
FIG. 8 is a diagram showing an example in which a content identification number has been printed on a document.

In Embodiment 3, when a document is copied, a determination is made as to whether the document includes content for which duplication processing is restricted, and thereafter processing such as that shown in FIGS. 3A and 3B, and 6 is performed. FIG. 8 is a diagram showing an example of a document that is copied. As shown in FIG. 8, an identification number 801 for identifying content for which duplication processing is restricted is included in a specified place in the document. This identification number corresponds to the corresponding item 702 shown in FIG. 7A. When copying processing is performed using the document, the table in FIG. 7A is referenced and the document name corresponding to the read identification number is searched for, and a determination is made as to whether the document includes content for which this duplication processing is restricted. If a determination is made that the document includes content having a restriction in place, the processing in FIGS. 3A and 3B or FIGS. 6A and 6B is performed.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-192489, filed Aug. 21, 2009, which is hereby incorporated by reference herein in its entirety.

The invention claimed is:

1. A data processing apparatus that processes performs duplication processing on document data, comprising:
   a first determining unit configured to determine whether or not the document data targeted for duplication processing includes content for which duplication is restricted;
   a generating unit configured to, in a case where a determination has been made that the document data includes the content for which duplication is restricted, generate deletion-completed document data in which the content for which duplication is restricted has been deleted from the document data, wherein content for which duplication is not restricted remains in the deletion-completed document data; and
   a saving unit configured to save a document ID, the deletion-completed document data, and link information including a storage location of the content for which duplication is restricted in association with each other.

2. The data processing apparatus according to claim 1, further comprising:
   a storing unit configured to store association information that associates information specifying the document on which the duplication processing is to be performed and the content for which duplication is restricted that is included in the document on which duplication is to be performed,
   wherein the first determining unit performs the determination with reference to the association information stored in the storing unit.

3. The data processing apparatus according to claim 1, further comprising:
   a counting unit configured to count a number of times duplication has been performed; and
   a second determining unit configured to determine, based on a value counted by the counting unit, whether the number of times duplication has been performed is equal to a predetermined reference value, or less than the predetermined reference value,
   wherein if the determination is made that the number of times duplication has been performed is less than the predetermined reference value, the saving unit saves the document ID, the deletion-completed document data, and the link information in association with each other.

4. The data processing apparatus according to claim 1, wherein the duplication processing includes at least one of print processing and data save processing.

5. The data processing apparatus according to claim 1, further comprising:
   a combining unit configured to combine the deletion completed document data associated with the document ID with the content specified by the link information associated with the document ID, according to an instruction for outputting the document data identified by the document ID;
   a outputting unit configured to visibly output the document data combined by the combining unit.

6. The data processing apparatus according to claim 5, wherein the outputting unit prints based on the document data combined by the combining unit.

7. The data processing apparatus according to claim 5, wherein the outputting unit displays based on the document data combined by the combining unit.

8. The data processing apparatus according to claim 1, wherein the link information is to be used for restoring the document data for management.

9. A data processing method executed in a data processing apparatus that processes performs duplication processing on document data, comprising the steps of:
  determining whether or not the document data targeted for duplication processing includes content for which duplication is restricted;
  generating, in a case where a determination has been made that the document data includes the content for which duplication is restricted, deletion-completed document data in which the content for which duplication is restricted has been deleted from the document data, wherein content for which duplication is not restricted remains in the deletion-completed document data; and
  saving a document ID, the deletion-completed document data, and link information including a storage location of the content for which duplication is restricted in association with each other.

10. A non-transitory computer-readable storage medium storing a program executed in a data processing apparatus that processes document data, the program causing a computer serving as the data processing apparatus to:
  determine whether or not the document data targeted for duplication processing includes content for which duplication is restricted;
  generate, in a case where a determination has been made that the document data includes the content for which duplication is restricted, deletion-completed document data in which the content for which duplication is restricted has been deleted from the document data, wherein content for which duplication is not restricted remains in the deletion-completed document data; and
  save a document ID, the deletion-completed document data, and link information including a storage location of the content for which duplication is restricted in association with each other.

* * * * *